(12) United States Patent
Meise

(10) Patent No.: US 6,695,373 B1
(45) Date of Patent: Feb. 24, 2004

(54) TRANSPARENT AUTO HEADREST

(76) Inventor: Karen Meise, 841 Durham Rd., Penns Park, PA (US) 18943

( * ) Notice: Subject to any disclaimer, the term of this patent is extended or adjusted under 35 U.S.C. 154(b) by 0 days.

(21) Appl. No.: 10/193,431

(22) Filed: Jul. 11, 2002

(51) Int. Cl.[7] ................................................ B60P 7/08
(52) U.S. Cl. ..................... 296/24.1; 296/63; 280/749
(58) Field of Search .............. 280/749; 296/63, 296/24.1

(56) References Cited

U.S. PATENT DOCUMENTS

| | | | | |
|---|---|---|---|---|
| 3,172,702 A | * | 3/1965 | Rose .......................... 297/397 |
| 3,525,535 A | * | 8/1970 | Kobori ....................... 280/749 |
| 3,643,972 A | * | 2/1972 | Caiati et al. ................ 280/749 |
| 3,645,556 A | * | 2/1972 | Kobori ....................... 280/749 |
| 3,865,450 A | * | 2/1975 | Bruenig ...................... 297/397 |
| 3,889,970 A | * | 6/1975 | Astheimer et al. .......... 280/749 |
| 4,592,523 A | * | 6/1986 | Herndon ............. 244/122 AG |
| 5,290,086 A | * | 3/1994 | Tucker ....................... 296/152 |
| 5,660,414 A | * | 8/1997 | Karlow et al. .............. 280/749 |
| 5,707,099 A | | 1/1998 | Schrader et al. ............ 296/180 |
| 5,879,048 A | * | 3/1999 | Tower ........................ 296/152 |
| 6,000,715 A | * | 12/1999 | Tschaeschke ............ 280/730.2 |
| 6,135,497 A | * | 10/2000 | Sutherland et al. ......... 280/749 |
| 6,554,339 B1 | * | 4/2003 | Moore ....................... 296/24.1 |
| 6,557,928 B2 | * | 5/2003 | Dreher et al. ............. 296/180.1 |
| 6,582,008 B2 | * | 6/2003 | Riehle et al. ............ 296/180.1 |
| 2001/0033084 A1 | * | 10/2001 | Murray ...................... 296/24.1 |
| 2002/0180197 A1 | * | 12/2002 | Saczalski et al. ........... 280/749 |

FOREIGN PATENT DOCUMENTS

| | | | |
|---|---|---|---|
| DE | 2 042 069 | * | 8/1970 |
| DE | 41 28 526 | * | 8/1991 |
| DE | 19622146 | * | 1/1996 |
| GB | 2 033 849 | * | 5/1980 |
| JP | 2001-122006 | * | 5/2001 |

* cited by examiner

Primary Examiner—Joseph D. Pape
(74) Attorney, Agent, or Firm—William H. Meise

(57) ABSTRACT

A head restraint for a vehicle is in the form of a transparent net or membrane which is supported above and/or to the rear of the seat back, as for example by attachments to vehicle structure such as the roof, the rear shelf support structure, and/or the seat back itself.

1 Claim, 4 Drawing Sheets

US 6,695,373 B1

TRANSPARENT AUTO HEADREST

FIELD OF THE INVENTION

This invention relates to head restraints for vehicles.

BACKGROUND OF THE INVENTION

Before the advent of head restraints in vehicles, whiplash and more severe injuries were occasioned by the tendency of a person's head to remain relatively fixed in position while their bodies were accelerated in a forward direction during a collision from the rear. Such accelerations tended to cause the passenger's head to move relatively rearward. Various types of head restraints have been used to prevent such relative rearward motion. The restraints are typically in the form of a cushion at roughly head height, and placed roughly above, and possibly slightly to the rear, of the passenger seat back.

One of the problems with such cushions is that they tend to obstruct the vehicle driver's view to the rear of the vehicle provided by a center-mounted rear-view mirror. For this reason, the head restraints in many cars are relatively low, and afford less protection than a higher-mounted restraint might provide. In many cars, the head restraints available for rear-seat passengers are even lower than those of front-seat passengers.

One technique for ameliorating the problem associated with reduced rear-view visibility attributable to rear-passenger head restraints is to make the rear restraints electrically movable from an operable position in which restraint is provided but the view is obstructed to an inoperable position in which the restraint is not in position for restraining the head, but visibility is improved. This solution is both expensive and does not solve the problem of visibility during those periods in which the rear seat is occupied with the head restraints in an operable position.

Improved head restraints are desired.

SUMMARY OF THE INVENTION

A vehicle according to an aspect of the invention is adapted for motion principally in a forward direction, and includes a passenger (where the driver is considered to be a passenger) seat including a seat back. The vehicle further includes a flexible, generally transparent rear or side head restraint for the passenger seat. The head restraint is a transparent, flexible structure, which may comprise a net or transparent membrane lying generally above the seat back. The side head restraint may lie somewhat toward one side of the passenger portion of the seat back. The head restraint further includes attachment means associated with the transparent, flexible structure and with a structure of the vehicle, for holding the transparent, flexible structure in a position such that the head of a passenger is restrained by the flexible, transparent structure, and not by the vehicle structure, when the vehicle accelerates in the forward direction in the case of a rear head restraint and in a transverse direction in the case of a side head restraint.

BRIEF DESCRIPTION OF THE DRAWING

FIG. 4b is a plan view of a portion of the vehicle of FIG. 4a.

DESCRIPTION OF THE INVENTION

According to an aspect of the invention, a head restraint for a vehicle includes a net, preferably of a relatively nonelastic material, which occupies the position normally allocated to a rear head restraint, whether that rear head restraint is associated with a front seat, rear seat, or any other seat lying therebetween. According to an aspect of the invention, the head restraint net is supported in an appropriate manner by fastening the net to the structure of the vehicle. The net, being partially an open structure, provides a relatively unobstructed view to the rear. The view of the driver is then obstructed only by the minimum possible matter, which matter is the head of the occupant of the seat associated with the head-restraint net. In this regard, it is noted that such net structures are normally viewed as being essentially transparent, in that even some of those vehicles which have movable rear-seat head restraints as described above also include an extensible or powered rear-window sunshade which is in the form of an open structure.

Figure 1:
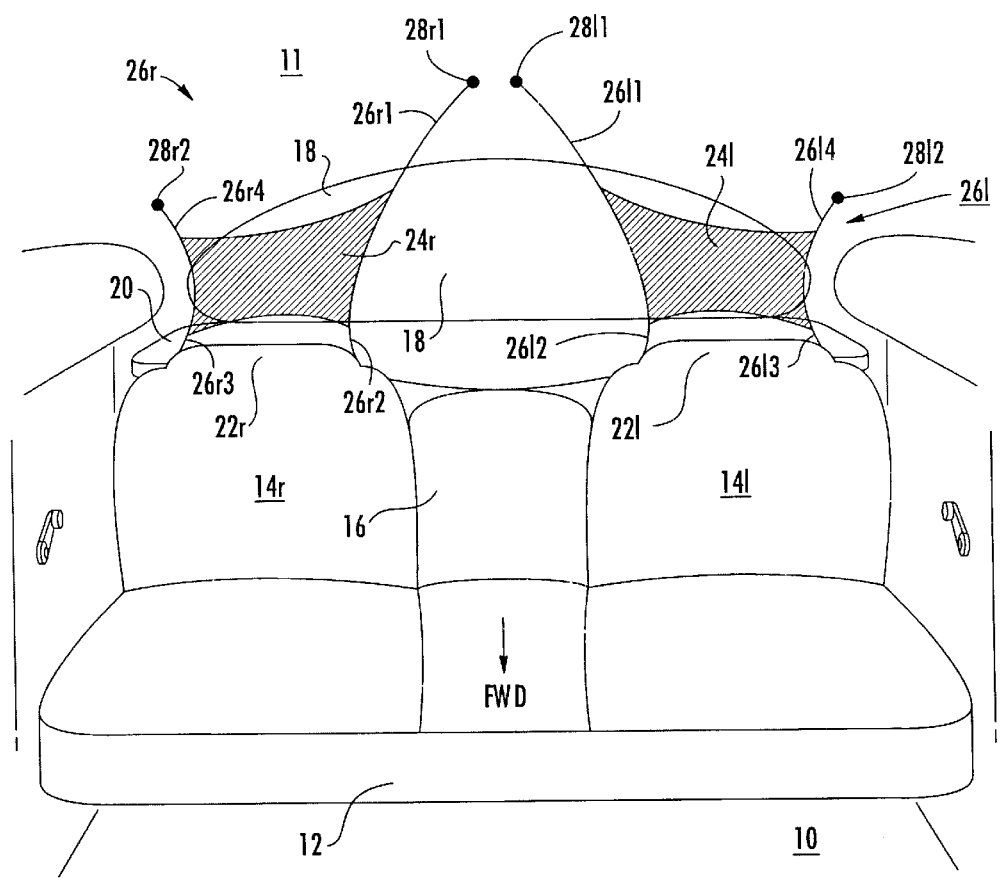
FIG. 1 is a simplified representation of the rear-seat portion of a vehicle adapted for forward motion, showing the rear window and a transparent head restraint arrangement according to an aspect of the invention.

FIG. 1 is a simplified perspective or isometric view of the rear seat of a passenger vehicle 10. In FIG. 1, the rear seat itself is designated 12, and right and left seat back portions for two passengers are designated 14r and 14l, respectively. The normal forward direction of the vehicle is indicated by the FWD arrow. In FIG. 1, a foldable console 16 is provided between the passenger seat portions. The rear window of the vehicle 10 is designated 18, and a conventional shelf 20 lies between the lower portion of window 18 and the rear of the rear seat backs 14r and 14l. A pair of upwardly protruding vestigial conventional head restraints 22r and 22l are formed in the top portions of the seat backs 14r and 14l, as is often found in conventional current passenger vehicles.

According to an aspect of the invention, a pair of head-restraint nets 24r and 24l are located above and/or to the rear of the seat backs 14r and 14l, respectively. In FIG. 1, nets 24r and 24l are illustrated by hatching, but this hatching is not necessarily to be taken as an indication of the actual weave or filament directions of the nets. Ideally, the material of the net should be slightly elastic when slightly deformed by the impact of a head, but rapidly reach an essentially inelastic condition to prevent excessive deflection. While this would be ideal, it is sufficient if the material of the net and its supports are essentially inelastic. As illustrated, each net 24r and 24l is supported by one or more attachments to the structure of the vehicle. In FIG. 1, head-restraint net 24 is supported several support elements or members designated generally as 26r, and more particularly by a first support element 26r1, which is affixed a location 28r1 on a portion of the roof 11 of the vehicle 10. A further support element 26r2 holds a lower corner of the net 24r to a support location (not visible in FIG. 10) on the shelf 20 supporting structure, which is behind vestigial head restraint 22r. Other net support elements 26r3 and 26r4 are affixed to other corners of net 24r and to the shelf 20 support (not illustrated) and to the roof at a location 28r2, respectively, for holding net 24r in a position suitable for preventing injury to a passenger in the event of a collision from the rear, which would tend to propel the vehicle forward and cause a whiplash injury, or worse injury. The roof support locations $28r1$ and $28r2$ for the net supports are preferably before (ahead of) the vestigial seat back $22r$ so that upon the occurrence of a collision from the vehicle rear and the resulting contact between a passenger head and the net, the upper support members $26r1$ and $26r4$ go into a tension mode more quickly than if the supports were directly over the vestigial head restraints $22r$. The net may be under initial tension, as suggested by the curvature of the various sides of the nets $24r$, $24l$. When a net $24r$ or $24l$ is under tension, it is believed that at least three of the associated support members $26r$ and $26l$ will also be under tension.

Similarly, left head restraint net $24l$ is held in place at a location generally above left vestigial head support $22l$ by a set $26l$ of four support elements $26l1$, $26l2$, $26l3$, and $26l4$, which are affixed to upper right, lower right, lower left, and upper left corners of the net $24l$, respectively, and to roof location $28l1$, shelf support, shelf support, and roof location $28l2$, respectively. The roof support locations $28l1$ and $28l2$ should be forward of the vestigial head restraint for the same reasons given in conjunction with the right net supports.

Figure 2:
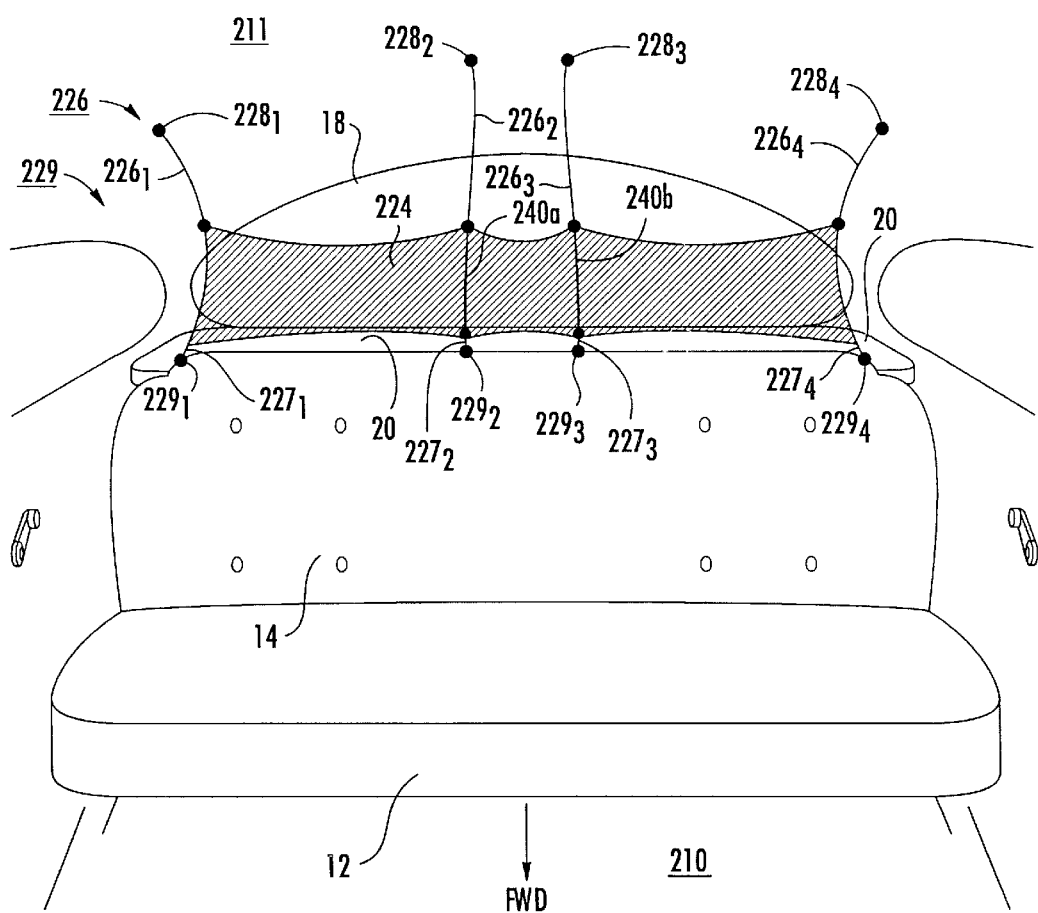
FIG. 2 is similar to FIG. 1, but shows the head restraint extending across the entirety of the rear seat of the vehicle.

FIG. 2 illustrates an alternative configuration of a head restraint net which may be more suitable for a vehicle 210 with bench seat than the arrangement of FIG. 1, because protection is provided for one or more center passengers sitting in the rear seat 12. In FIG. 2, elements corresponding to those of FIG. 1 are designated by like reference numerals. The arrangement of FIG. 2 includes a head-restraint net extending across the head-restraint positions of more than one passenger. More particularly, the head-restraint net 224 of FIG. 2 extends more or less completely across the rear of the bench seat 12, 14, to afford protection not only to passengers riding on the two side positions, but additionally to any further passengers riding in the vehicle in central portions of the rear seat 12. The net 224 is supported by a set 226 of upper support elements $226_1$, $226_2$, $226_3$, and $226_4$, which are affixed to the vehicle structure, such as locations $228_1$, $228_2$, $228_3$, and $228_4$ on the roof 211 of the vehicle 210. The lower portion of the net is supported by a set 229 of lower support elements $227_1$, $227_2$, $227_3$, and $227_4$ affixed to locations $229_1$, $229_2$, $229_3$, and $229_4$, on (or near) the support structure of shelf 20. Additional support tension members may be included between the points of attachment of the net 224 to the various support members or elements, such as tension members 240a and 240b extending between the net attachment locations of support elements $226_2$; $227_2$ and $226_3$; $229_3$, respectively.

Figure 3:
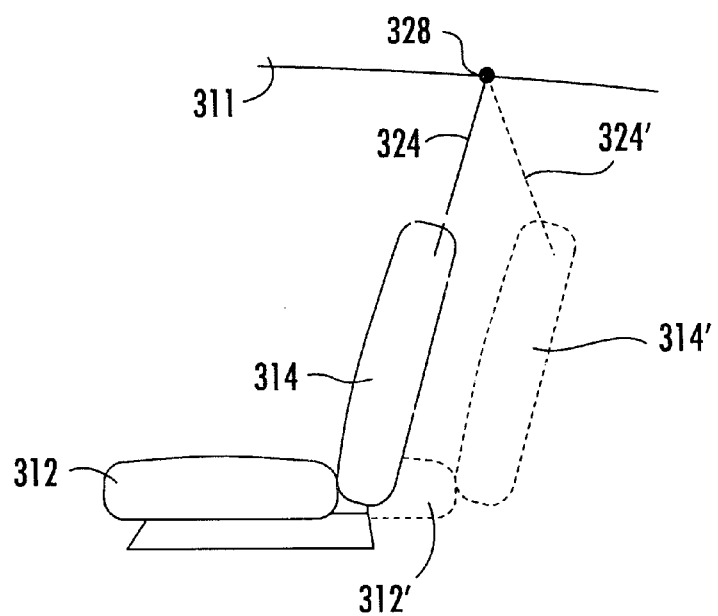
FIG. 3 is a side elevation view of a forward-facing seat of a vehicle, where the forward-facing seat is movable in a fore-aft direction, showing one way to support a head restraint according to an aspect of the invention.

FIG. 3 is a side view of a front seat of a vehicle, showing one way in which a head restraint according to an aspect of the invention may be mounted. In FIG. 3, the illustrated position of the seat 312 and back 314 is the forward-most position, and the phantom position 312', 314' is the rear-most position, as known to any driver. As illustrated in FIG. 3, the head restraint net 324, 324' is seen in cross-section, and is illustrated as being planar, although it may in actuality be partially deformed out-of-plane. The upper support locations for net 324 are illustrated as 328, but it must be realized that these may be at two different locations, one near the center of the roof of the vehicle, and the other near the side of the roof. The lower portion of the head restraint net is supported or restrained by the upper portion of the seat back. Movement of the seat from the forward-most position to the rear-most position somewhat changes the protection. It will be noted that for a tall passenger, who is more likely than a short passenger to move the seat toward the rear-most position, the head restraint net is closer to the rear of the head, which thereby provides more protection in the event of a rear collision. On the other hand, a short passenger, who is more likely to have the seat set forward, requires less protection, because his head is less likely to protrude above the top of the seat back. Thus, the mounting arrangement tends to compensate for seat position variation in an advantageous manner.

Figure 4A:
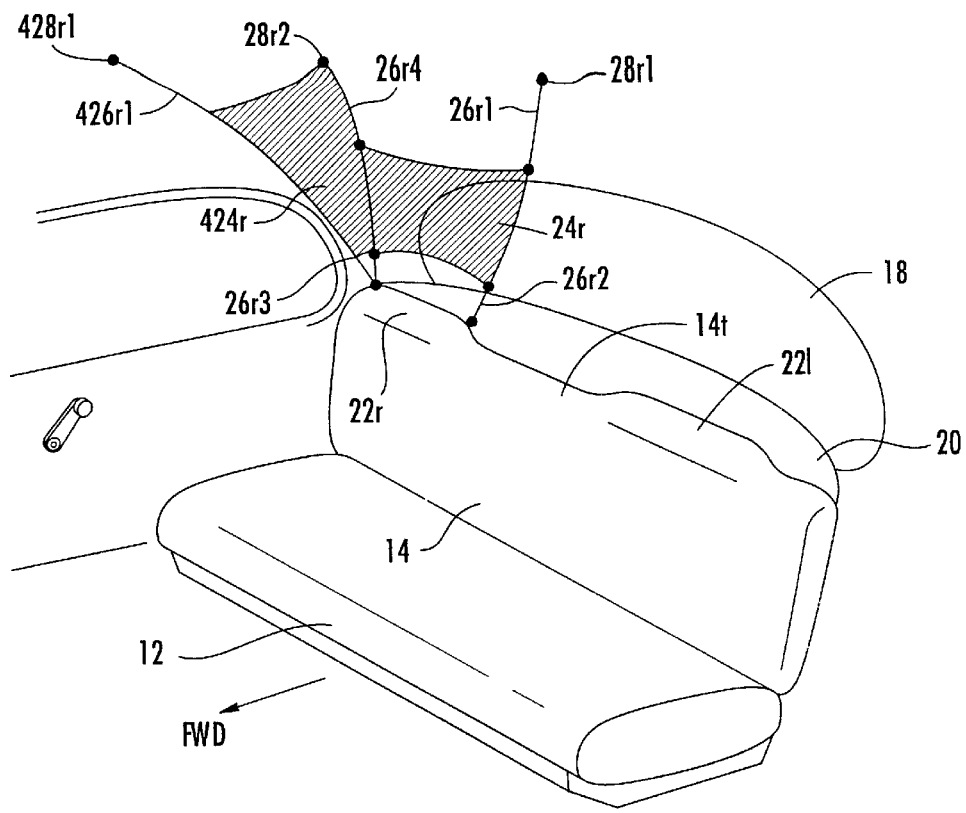
FIG. 4a is a perspective or isometric view of a portion of a vehicle similar to that of FIG. 1, seen from the right side of the vehicle, showing a transparent side head restraint.
Figure 4B:
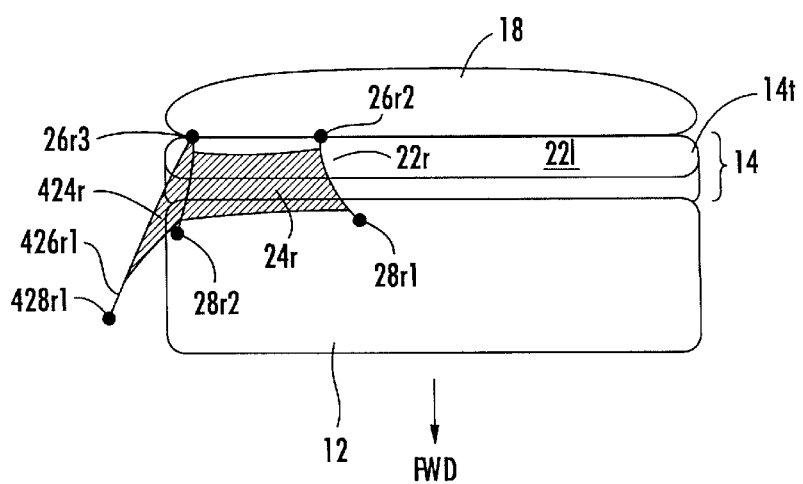

FIG. 4a is a perspective or isometric view of a rear passenger portion of a vehicle, looking toward the right side of the vehicle from a location generally outside the vehicle. FIG. 4b is a plan view of a portion of the vehicle seen in FIG. 4a. In FIGS. 4a and 4b, elements corresponding to those of FIG. 1 are designated by like reference numerals. The upper portion of seat back 14 is designated 14t. As illustrated, an additional transparent head restraint portion $424r$ is provided, to aid in preventing contact of the right-rear passenger's head with the vehicle structure in the event of a side collision. Of course, an additional corresponding side head restraint may be associated with the left passenger seat, but the left rear passenger head restraints are not illustrated in order to simplify the drawing. Additional side head restraint portion $424r$ is connected by way of a support element or member $426r1$ to an additional roof affixation point $428r1$, and to either roof support location $28r2$ or some other equivalent location. The lower edge of side head restraint $424r$ is supported by affixation to a vehicle support structure near location $26r3$, so that the side head restraint takes on a generally triangular shape.

While the side head restraint is shown only in association with the right side of the right rear passenger's location, another equivalent side head restraint may be mounted in a corresponding location to the left of the right front passenger, to aid in avoiding excessive head deflection to the left. Thus, in such an arrangement in which the right rear passenger has a transparent rear head restraint together with both right and left transparent side head restraints, the entire transparent head restraint system tends to take on a unitary appearance. However, it must be understood that the side and rear head restraints may be independently supported rather than interconnected as shown. In addition to providing transparent rear passenger side head restraints, the front passenger and driver passenger may also be provided with such side head restraints.

According to a further aspect of the invention, a transparent, flexible (but nonextensible or nonelastic) membrane or sheet is supported in much the same manner as the nets described, and provide similar head restraint protection while providing improved rear view to the driver and passengers.

As an alternative, the mounting positions of the support elements for the head restraint net or membrane may be made movable, either manually or in response to the movement of the associated seat, to thereby optimize comfort and or safety.

An advantage of the net or membrane head restraints according to the various aspects of the invention is that they may be lighter in weight than the conventional rigid, padded head restraints, which decrease in weight, as known, tends to improve fuel mileage.

Other embodiments of the invention will be apparent to those skilled in the art. For example, while the head restraint nets have been illustrated as having corners, they may be rounded or have other shapes, as may be desired or convenient. While four supports have been described for the head restraint nets of FIG. 1, any number may be used. In particular, three supports could in principle be used, with a cost saving over the use of four supports. While tension elements or members have been described for supporting the net or membrane, rigid members may also be used. Additionally, while the roof has been illustrated as one of the locations to which attachment of the head restraint is made, convertibles, roadsters, and other open vehicles may have other types of structures to which attachment can be made. In particular, a fixed roll bar or a roll-bar which leaps into position in the event of a collision would be an excellent "upper" support for a head restraint according to an aspect of the invention. The flexible, transparent membrane or net may be planar when removed from the supporting elements, or it may be given a tendency to set, or a modicum of rigidity.

Thus, a vehicle (10, 210) according to an aspect of the invention is adapted for motion principally in a forward (FWD) direction, and includes a passenger seat (12, 14; 312, 314) including a seat back, where the driver is also considered to be a passenger. The vehicle (10, 210) further includes a head restraint (24r, 24l; 224; 324) for the passenger seat. The head restraint (24r, 24l; 224; 324) includes a net or a transparent membrane lying generally above the seat back. Since the net is a perforated or open structure, it is also transparent. The head restraint (24r, 24l; 224; 324) further includes attachment means (26r, 26l; 226, 229; 328) associated with the net or membrane and with a structure (11, shelf support; 211; 311) of the vehicle (10, 210), for holding the net or membrane in a position such that the head of a passenger is restrained by the net or membrane, when the vehicle accelerates in the forward direction, as may occur in a rear-end collision.

What is claimed is:

1. A vehicle adapted for motion principally in a forward direction, said vehicle comprising:

a side window;

a passenger seat adjacent said side window, and including a seat back; and a head restraint for said passenger seat, said head restraint including a flexible, generally transparent first restraint structure lying generally above said seat back and transverse to said forward direction, said head restraint further including flexible first attachment means associated with said flexible, generally transparent first restraint structure and with a structure of said vehicle for holding said flexible, generally transparent first restraint structure in a position such that the head of a passenger occupying said seat is restrained by said flexible, generally transparent structure, and not directly by said structure of said vehicle, when said vehicle accelerates in said forward direction, said head restraint further including a flexible, generally transparent side restraint portion, said side restraint portion lying generally parallel with said side window, said head restraint further including flexible second attachment means associated with said side restraint portion and with said structure of said vehicle, for holding said side restraint portion in a position such that the head of a passenger occupying said seat is restrained by said side restraint portion and not directly by said structure of said vehicle when said vehicle accelerates transversely to bring the head toward contact with said side restraint portion, said first and second attachment means including at least one member in common.

* * * * *